United States Patent [19]

Beikirch et al.

[11] Patent Number: 4,878,119

[45] Date of Patent: Oct. 31, 1989

[54] SYSTEM FOR SYNCHRONIZING INTEGRATION PULSES WITH INTEGRATION SIGNAL IN AN ASYNCHRONOUS RASTER INPUT SCANNER

[75] Inventors: Thomas R. Beikirch, Webster; James C. Traino, Fairport; Leon C. Williams, Penfield, all of N.Y.

[73] Assignee: Xerox Corporation, Stamford, Conn.

[21] Appl. No.: 161,886

[22] Filed: Feb. 29, 1988

[51] Int. Cl.⁴ ............................................. H04N 1/04
[52] U.S. Cl. .................................... 358/471; 358/486; 358/412
[58] Field of Search ............... 358/267, 264, 285, 288, 358/294, 213.11

[56] References Cited

U.S. PATENT DOCUMENTS

| | | | |
|---|---|---|---|
| 4,432,023 | 2/1984 | Mehalek | 358/293 |
| 4,541,061 | 9/1985 | Schoon | 364/518 |
| 4,587,415 | 5/1986 | Tsunekawa et al. | 250/204 |
| 4,591,727 | 5/1986 | Gaebelein et al. | 250/578 |
| 4,628,368 | 12/1986 | Kurata et al. | 358/293 |
| 4,630,120 | 12/1986 | Childs | 358/214 |
| 4,771,333 | 9/1988 | Michaels | 358/213.29 |

Primary Examiner—James J. Groody
Assistant Examiner—Robert M. Bauer
Attorney, Agent, or Firm—Frederick E. McMullen

[57] ABSTRACT

Process and apparatus for allowing a raster input scanner with scanning array to operate asynchronously in which timing of the fixed rate shift pulses which delineate the integration period of the array is changed to maintain the shift pulses in timed synchronization with a random integration signal.

5 Claims, 5 Drawing Sheets

SYSTEM FOR SYNCHRONIZING INTEGRATION PULSES WITH INTEGRATION SIGNAL IN AN ASYNCHRONOUS RASTER INPUT SCANNER

The invention relates to a raster input scanner, and more particularly, to an asynchronously operated raster input scanner.

Raster input scanners typically employ one or more arrays such as CCD's for scanning. The array converts each scanned image line into a series of charges which, following suitable processing, are output as image signals or pixels to an end user. Scanners of this type often use a transparent platen on which the image bearing document is placed face down. The scanning array, for example, may be carried on a carriage which traverses back and forth under the platen to provide the necessary relative motion between image and array. Other arrangements such as a fixed scanning array with movable document, etc., may be contemplated instead. An optical system focuses the array onto the image, and one or more lamps are provided to illuminate the image.

In the typical scanning process, the image area viewed by each of the array photosensors is converted into a charge potential representative of the image gray level. Scanning takes place during an integration period of preset duration. Following integration, the image charges are transferred to a pair of analog shift registers, the operating sequence being such that during the integration period, the image charges from the previously scanned line are clocked from the shift registers, leaving the shift registers free to receive the image charges from the next integration period. The duration of the integration period, which must be sufficiently long to fully integrate the image line being scanned, yet not so long as to allow the array photosensors to become saturated, is measured by periodic fixed rate clock signals, referred to as shift pulses herein.

Where the scanner operates in a synchronous manner, relative scanning movement between array and image is at a fixed rate. This in turn permits timing of the shift pulses and the signal requesting the next line of image signals, referred to herein as the integration signal, to be synchronized with one another. However, where the scanner operates asynchronously, the relative scanning movement between array and image is not fixed but can change with demand. As a result, the integration signal timing may vary and not be in synchronism with the fixed rate shift pulses. This may reduce the integration period, resulting in incomplete integration of the image line being scanned.

In the prior art, U.S. Pat. No. 4,541,061 to Schoon discloses a system where, in a scanning apparatus, the operating clock signals are provided at a rate that matches the varying velocity of the scanning mirror through the use of a memory in which various clock rates are stored based on the known repetitive movement of the mirror, there being addressing means for addressing the memory locations. In U.S. Pat. No. 4,587,415 to Tsunekawa et al, a photodetector with timing control for controlling the information storage and information readout process of the detector is disclosed. And, in U.S. Pat. No. 4,628,368 to Kurata et al, there is disclosed a system for controlling the scanning rate of a document reader in which the speed, acceleration, and deacceleration of the reader are set according to image information stored in a buffer memory.

In contrast, the present invention provides a process for operating a scanning array asynchronously, the array having at least one row of sensors for scanning an image viewed by the array during an integration period, and at least one shift register for receiving the image signal charges developed by the sensors following the integration period, comprising the steps of: periodically generating at a constant clock rate integration pulses defining a succession of predetermined integration intervals; generating a start integration signal in response to a demand for a line of image signals; where the time at which the start integration signal occurs is different than the time at which the integration pulses occur, interrupting the current one of the predetermined integration intervals in response to the start integration signal whereby to commence a new one of the predetermined integration intervals for providing the line of image signals; and resetting the integration pulses so that the integration pulses and the start integration signal are in timed synchronization with one another.

The invention further provides a scanning system comprising: at least one scanning array for asynchronously scanning an image line by line to provide image signals representative of the image scanned having at least one row of sensors for scanning an image viewed by the array during an integration period and at least one shift register for receiving the image signal charges developed by the sensors following the integration period; clock means for periodically generating a succession of integration pulses, the interval between each successive pair of the integration pulses providing an integration period of predetermined fixed length; means for generating a start integration signal in response to a demand for a line of image signals; and control means responsive to the start integration signal for interrupting the current one of the integration periods to start the next of the integration periods when the start integration signal is not synchronized with the integration pulses, the control means including means to displace subsequent ones of the integration pulses to bring the subsequent integration pulses into timed synchronization with the start integration signal.

IN THE DRAWINGS

Figure 1:
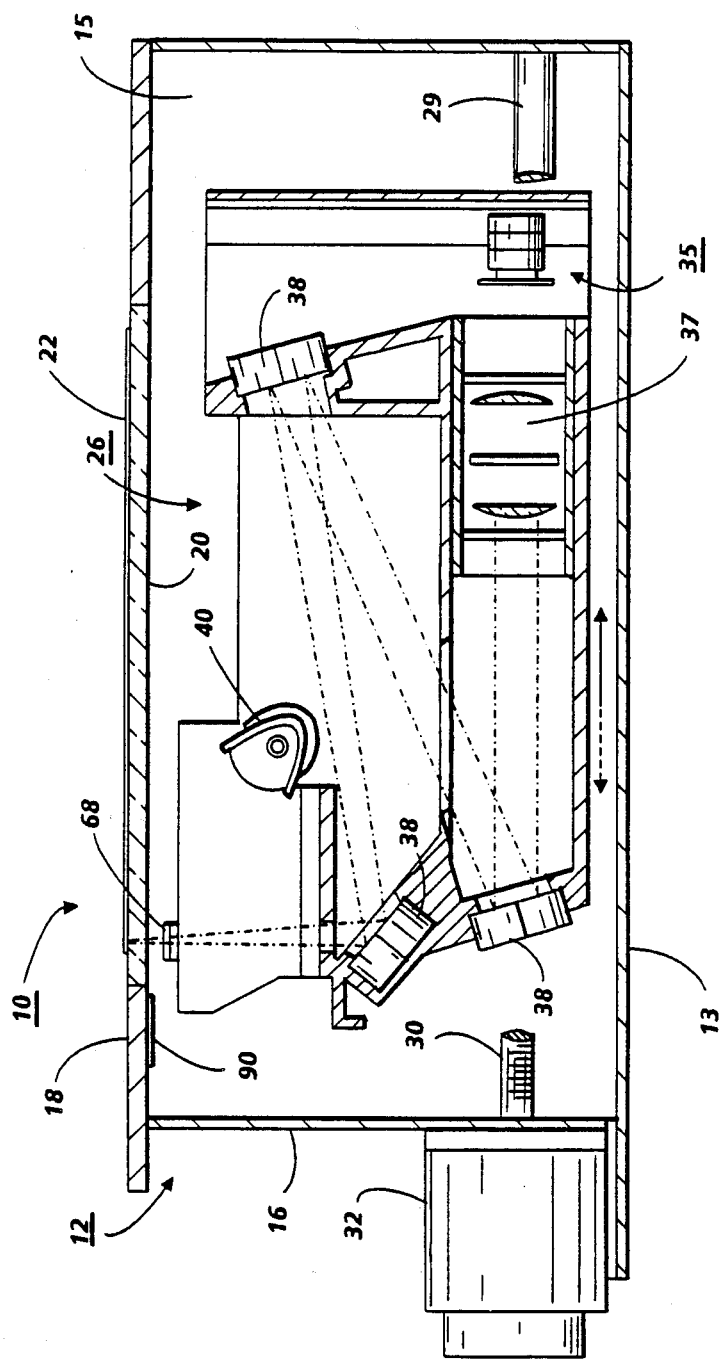
FIG. 1 is a schematic view of a raster input scanner of the type adapted for asynchronous operation in accordance with the present invention.

Referring to FIG. 1, there is shown an exemplary raster input scanner, designated generally by the numeral 10, of the type which is to be asynchronously operated in accordance with the teachings of the present invention. Scanner 10 includes a housing 12 with base 13, sides 15, and ends 16. The top 18 of housing 12 incorporates a generally rectangular transparent platen 20, typically glass, sized to accommodate the largest document original 22 to be scanned. As will be understood, a document 22 to be scanned is located either manually or by a suitable automatic document handler or feeder (not shown), on platen 20 for scanning. A scan carriage 26 is movably supported within housing 12 on base 13 for reciprocable movement underneath platen 20 on one or more longitudinally extending rails 29. Carriage driving means in the form of a drive screw 30 threadedly engaged with carriage 26 is provided, rotation of screw 30 in either a clockwise or counter-clockwise direction by a reversible carriage driving step motor 32 serving to move carriage 26 in either a forward or reverse direction as shown by the arrows in drawing FIG. 1.

A scanning array 35 such as a CCD is suitably mounted on scan carriage 26 in predetermined operative relation with platen 20 so as to scan the document resting thereon. Suitable optical means, exemplified here by lens 37 and mirrors 38, are provided to focus array 35 on a line-like area extending across the width of platen 20 and perpendicular to the direction of movement of carriage 26. A lamp 40 is provided for illuminating the line-like area on which array 35 is focused. A suitable clock 45 (shown in FIG. 2) provides clock signals including clock pulses $\phi_{SH}$ and convert pulses $\phi_1$, $\phi_2$ to array 35. The image signals generated by scanning array 35 are converted to digital form by an analog-to-digital (A/D) converter 47 (shown in FIG. 3).

While a single scanning array 35 is shown and described, plural arrays may instead be envisioned.

In the ensuing description, the integration signal (INT) refers to a request for the next line of image signals while the periodic integration that occurs in response to clock pulses $\phi_{SH}$ is referred to as the integration period (INT PERIOD).

Figure 2:
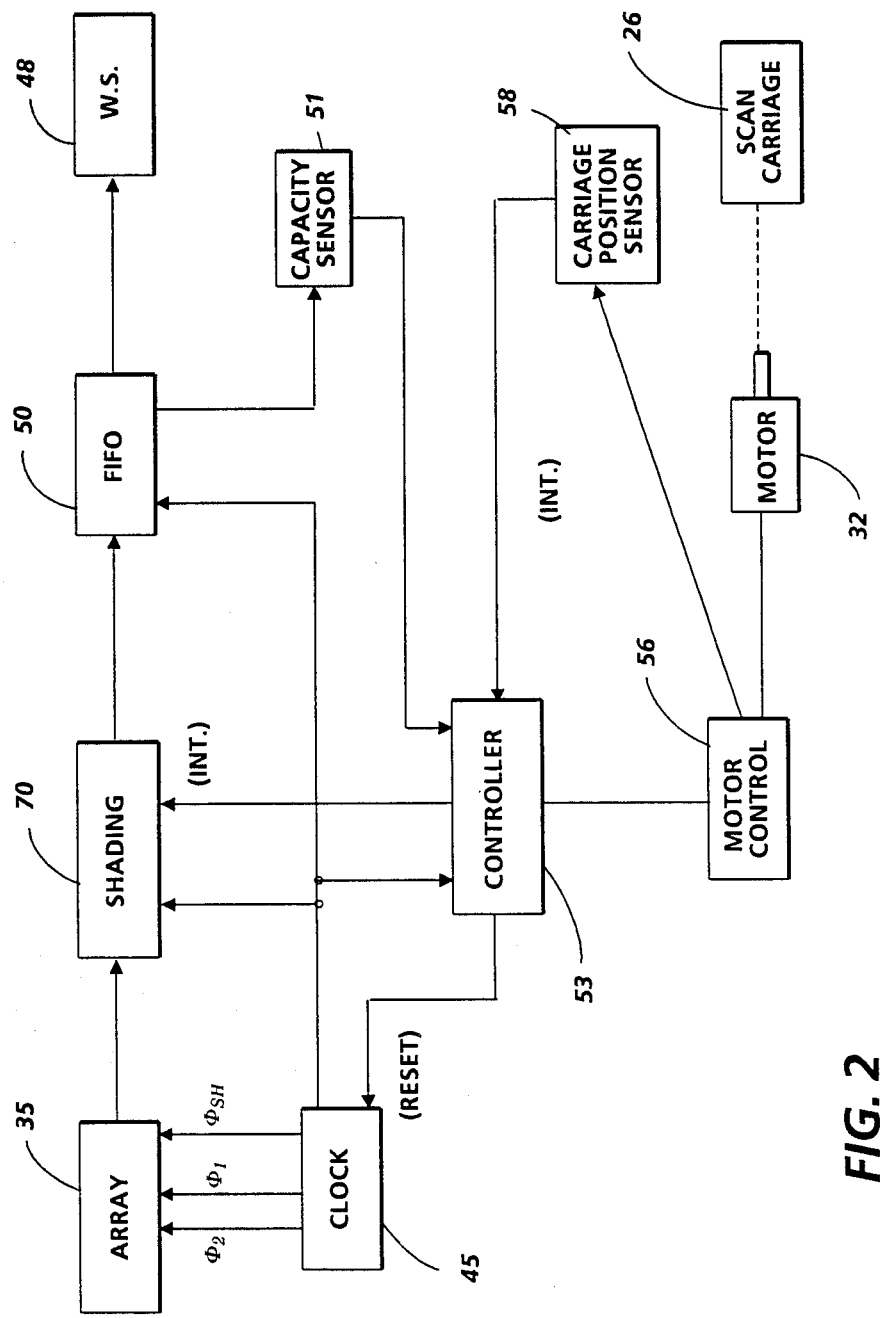
FIG. 2 is a schematic block view showing the principal operating elements of the scanner shown in FIG. 1.

Scanner 10 is operated asynchronously at a variable scanning rate in response to the demand for image signals by the user or workstation 48 which may, for example, comprise a publishing workstation, personal computer, printer, etc. Referring to FIG. 2, image signals from array 35, after suitable processing including conversion to digital format, are output to the user through a relatively small First in-First out (FIFO) buffer 50. A buffer capacity sensor 51 continuously monitors the residual capacity of buffer 50, the signal from buffer capacity sensor 51 being input to the scanner controller 53. Controller 53 controls carriage motor 32 through a suitable motor controller 56 to regulate the direction in which scan carriage 26 moves and carriage scanning speed, the latter in order to control the residual storage capacity of buffer 50. As a result, the fuller buffer 50 is, the slower the scanning speed, and vice versa. A suitable carriage position sensor 58 tracks movement of carriage 26 through motor control 56, controller 53, on movement of carriage 26 with array 35 through a distance equal to one scan line, outputting an integration signal (INT). As will appear, at each integration signal (INT), there is output a good scan line of image signals to buffer 50. A variable rate scanning system of the type referred to above is shown and disclosed in copending application Ser. No. 945,156, filed on Dec. 22, 1986, in the name of Gregory E. Bell, and now U.S. Pat. No. 4,748,514 issued on May 31, 1988 incorporated by reference herein.

Figure 3:
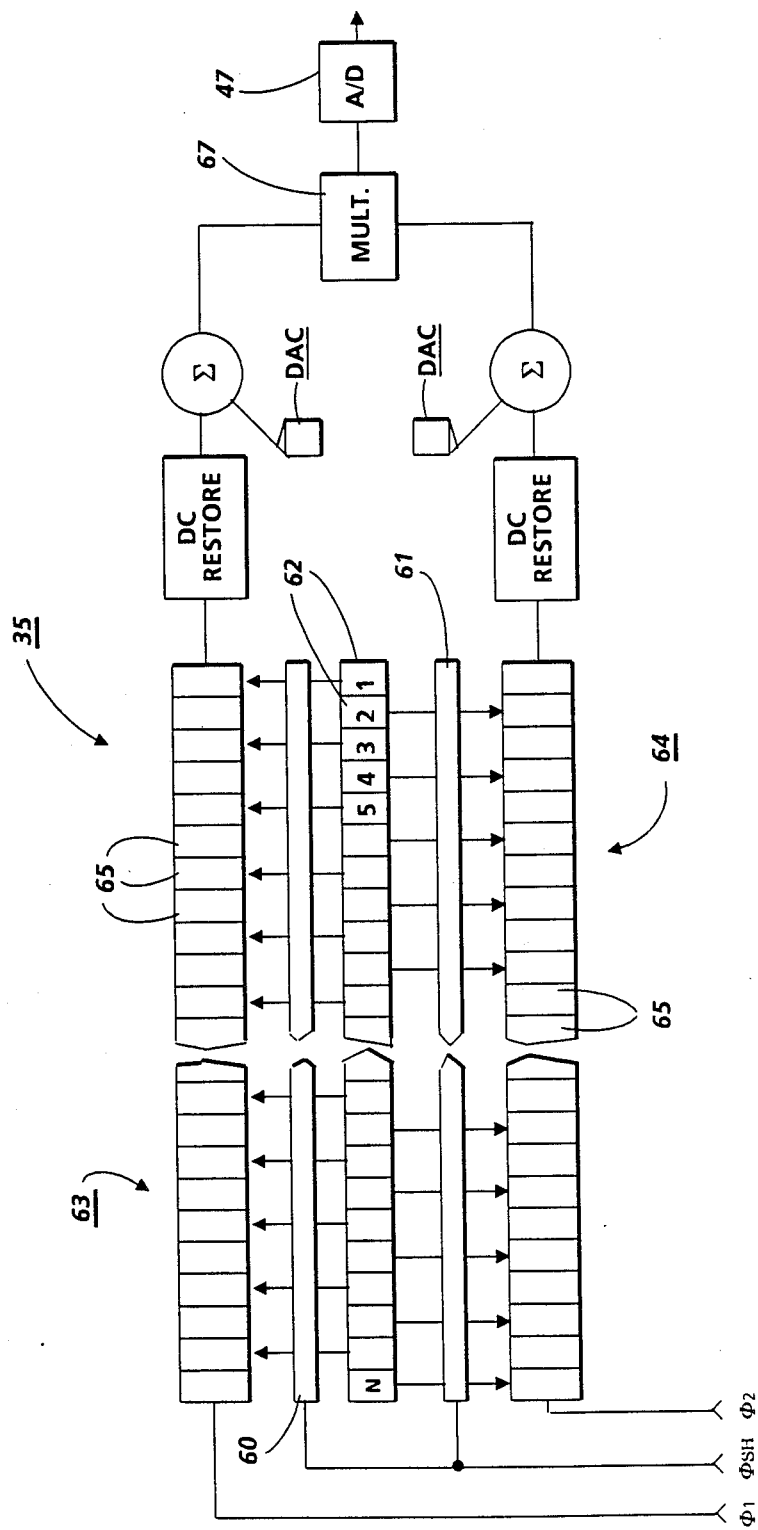
FIG. 3 is a schematic view showing details of the scanning array used with the scanner shown in FIG. 1.
Figure 4:
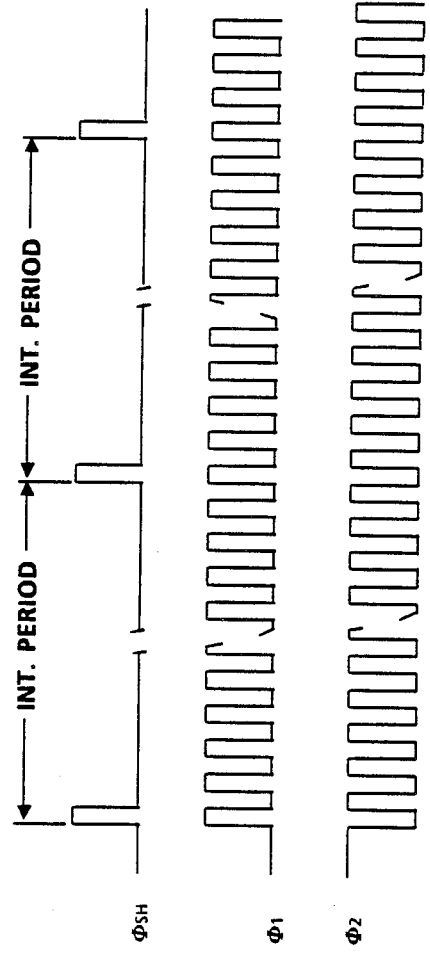
FIG. 4 is a timing chart depicting the timing relationship between the shift pulses which define the integration period (INT PERIOD) and the shift register clocking pulses.

Referring to FIGS. 3 and 4, shift pulses $\phi_{SH}$ are input periodically at a fixed clock rate to the array 35. The time between successive shift pulses $\phi_{SH}$ determines the length of time or integration period (INT PERIOD) during which charges are allowed to accumulate on the photosites 62 of array 35, the charge potentials on the individual photosites being a function of the grey level of the area of the image line viewed by each photosite. At each shift pulse $\phi_{SH}$, shift gates 60, 61 transfer the image signal charges accumulated by the photosites 62 to an analog shift register pair 63, 64 respectively, charges from the odd numbered photosites (i.e., 1, 3, 5, ... n−1) being transferred to successive stages 65 of shift register 63 while the charges from the even numbered photosites (i.e., 2, 4, 6, ... n) are transferred to successive stages 65 of shift register 64.

Figure 5:
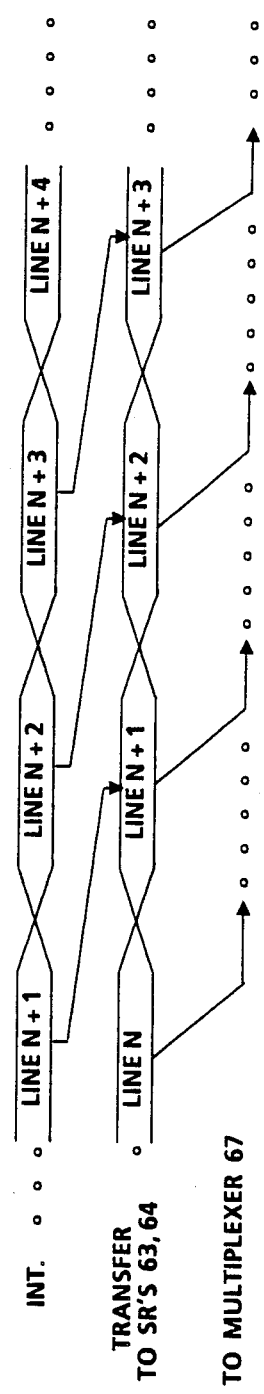
FIG. 5 is a view showing the general timing interrelationship between image line integration and image line discharge.

As depicted in FIG. 5, while each image line (i.e., line N+2) is being scanned and integrated, charges transferred to shift registers 63, 64 from the previous line (i.e. line N+1) are clocked out in alternating fashion by clock impulses $\phi_1$, $\phi_2$ to a multiplexer 67 (MULT) which provides a stream of image signal charges to A/D converter 47. From A/D converter 47, the digital image signals are clocked via a shading circuit 70 to buffer 50 and workstation 48. Clearing of shift registers 63, 64 is timed to occur during the integration period so that as one line is being integrated, shift registers 63, 64 are being emptied of the image signal charges from the previous line.

As will be understood, photosites 62 of array 35 can become saturated if not cleared of image signal charges within a predetermined time interval or window. An exemplary saturation interval for an array such as array 35 is 6 ms. In order to prevent saturation of the photosites 62, shift pulses $\phi_{SH}$ (which define the integration periods) are normally generated at a rate greater than that of the saturation interval. An exemplary rate for the shift pulses $\phi_{SH}$ is 2 ms.

The digital image signals output from A/D converter 47 are further processed by shading circuit 70 (shown in FIG. 2). Shading circuit 70 responds to the integration signal (INT) to transfer the line of image signals received from array 35 through any subsequent processing circuits (not shown) to buffer 50 and work station 48. In the absence of an integration signal (INT), the image signals received from array 35, which is continuously scanning, are discarded or dumped. For example, where the residual capacity of buffer 50 is reduced below a preset minimum, the scan carriage ceases to move and hence integration signals (INT) are not generated. Accordingly, the image signals received from the array are discarded.

Figure 6:
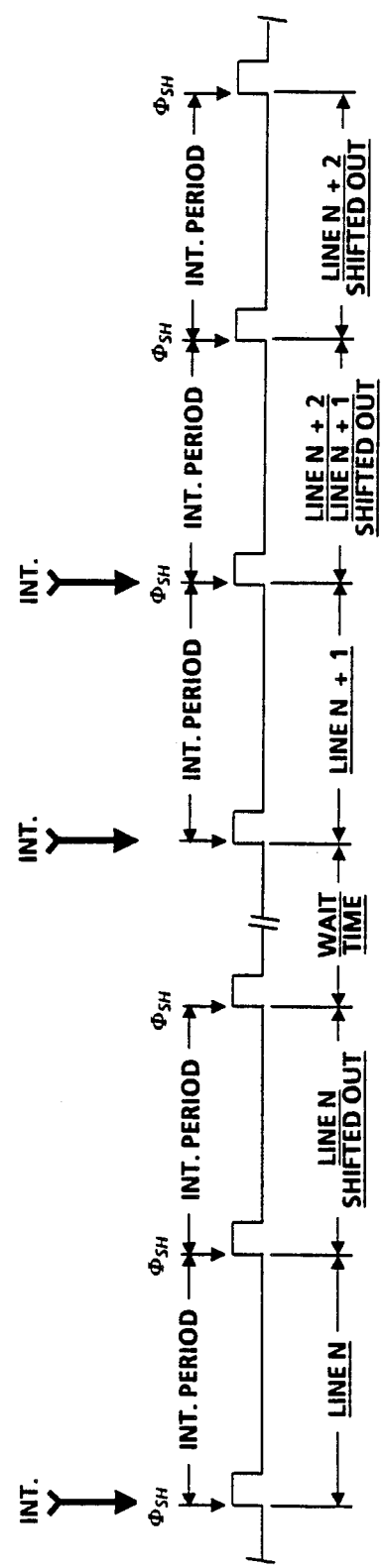
FIG. 6 is a schematic view illustrating the timing relation between the integration signals (INT) and the shift pulses enabling the asynchronous scanner of the present invention.

Referring now to FIG. 6, in asynchronous operation, the speed at which carriage 26 moves (and hence the rate at which integration signals are generated) can change in response to user demand as reflected by the residual capacity of buffer 50. Thus, irregular intervals between integration periods can occur during acceleration, deacceleration, and even steady state scanning speed of scan carriage 26. As a result, the integration signal (INT) will not always coincide with the current shift pulses $\phi_{SH}$ which determine the length of the integration period.

To accommodate this and re-establish synchronism between the shift pulses $\phi_{SH}$ and the integration (INT) signals so as to assure that the required integration interval takes place, shift pulses $\phi_{SH}$ are reset whenever the shift pulses are out of synchronism with the integration (INT) signal.

Referring particularly to FIGS. 2 and 6, on a predetermined increase in the residual capacity of buffer 50, buffer capacity sensor 51 outputs a request for a line of image signals (NEXT LINE) to controller 53. Controller 53 responds by actuating motor controller 58 which actuates carriage drive motor 32 to move or adjust the scanning speed of scan carriage 26. On movement of carriage 26 through a distance equal to one image line, carriage position sensor 58 outputs an integration signal (INT) to controller 53, instructing array 35 to start scan of the next image line (i.e., line N). Controller 53 responds by outputting an integration (INT) signal to shading circuit 70 and a shift pulse reset signal (RESET) to clock 45. Clock 45 resets timing of shift pulses $\phi_{SH}$ to in effect shift pulses $\phi_{SH}$ and bring the shift pulses into alignment, i.e., synchronism, with the integration (INT) signal. This assures the required integration period (INT PERIOD) necessary for array 35 to integrate the image line viewed by the array (i.e., line N). On the next shift pulse $\phi_{SH}$, the integration period is ended and the accumulated image data transferred to shift registers 63, 64. During the following integration period, the data is shifted via multiplexer 87 and A/D 47 to shading circuit 70 which transfers the image signals representing the line scanned (i.e., line N) through any subsequent processing circuits (not shown) to buffer 50.

Where the demand for image signals by workstation 48 remains substantially constant, the scanning speed of scan carriage 26 is also substantially constant. As a result, an equilibrium condition is reached where as each line of image signals is output to workstation 48 from buffer 50, a fresh line of image signals is supplied to buffer 50 by array 35. In this circumstance, the integration signals (INT) remain synchronized with shift pulses $\phi_{SH}$ and no further adjustment of the timing of the shift pulses is necessary.

Where the demand for image signals by workstation 48 changes, the scanning speed of scan carriage 26 changes in response thereto. As a result, the integration signals (INT) are no longer synchronized with shift pulses $\phi_{SH}$. In this circumstance, the signal (RESET) from controller 53 adjusts timing of shift pulses $\phi_{SH}$ to maintain the integration (INT) signals synchronized with the shift pulses in the manner described above.

Where timing of the integration signal (INT) is different than the shift pulses $\phi_{SH}$, the integration period (INT PERIOD) in process at the time the integration signal is received is prematurely terminated. This may, in turn, result in incomplete clearing or purging of all the stages of shift registers 63, 64 of array 35 prior to receipt of the charges from the next scan. While this may result in some distortion or inaccuracy in image signal output, such distortion can normally be offset by subsequent image processing such as for example, by thresholding or screening. Further, the small amount of distortion that may occur is far outweighed by the reduced cost of the aforedescribed system, a factor that is particularly important in the case of low cost scanners where some degree of image distortion is normally tolerated in order to keep scanner cost at a minimum.

While an exemplary scanner is shown and described, other suitable scanner designs and types for effecting relative scanning movement between the image bearing document and the scanning array may be contemplated such as, for example, a scanner of the type where the image document is moved past a scan slit by a document transport for scanning by a stationary array. Further, the invention is not limited to the particular array type described but instead contemplates any array type in which it is desirable to minimize residual charges in the array shift register or shift registers due to asynchronous operation.

While the invention has been described with reference to the structure disclosed, it is not confined to the details set forth, but is intended to cover such modifications or changes as may come within the scope of the following claims.

We claim:

1. A process for operating a scanning array asynchronously, said array having at least one row of sensors for scanning an image viewed by the array during an integration period, and at least one shift register for receiving the image signal charges developed by the sensors following the integration period, comprising the steps of:
    (a) generating start integration signals in response to a demand for a line of image signals;
    (b) continuously generating at a constant clock rate integration shift pulses defining a succession of predetermined integration intervals in synchronism with said start integration signals;
    (c) where timing of a new start integration signal changes so that said start integration signals and said shift pulses are out of synchronism with one another, prematurely interrupting the current one of said predetermined integration intervals to start a new one of said predetermined integration intervals; and
    (d) resetting said shift pulses so that said shift pulses are in synchronization with said new start integration signal.

2. A process for operating a raster input scanner having at least one scanning array for scanning the image line viewed by said array asynchronously, comprising the steps of:
    (a) continuously generating integration shift pulses at a constant clock rate defining a succession of spaced timed intervals for controlling integration of the image line viewed by said array;
    (b) generating a start integration signal in response to a demand for a line of image signals; and
    (c) where said start integration signal and said shift pulses are out of synchronism, shifting said shift pulses to bring said shift pulses into synchronism with said start integration signal.

3. A process for operating a scanning array asynchronously, said array having at least one row of sensors for scanning an image viewed by the array during an integration period, and at least one shift register for receiving the image signal charges developed by the sensors following the integration period, comprising the steps of:
    (a) continuously generating at a constant clock rate integration shift pulses defining a succession of predetermined integration intervals;
    (b) generating a start integration signal in response to a demand for a line of image signals;
    (c) triggering start up of the next one of said predetermined integration periods in response to said integration signal; and
    (d) where said integration signal does not coincide with the next shift pulse, resetting said shift pulses so that said shift pulses and said start integration signal are in timed synchronization with one another.

4. In a scanning system having at least one scanning array for asynchronously scanning an image line by line to provide image signals representative of the image scanned, said array having at least one row of sensors for scanning an image viewed by the array during an integration period, and at least one shift register for receiving the image signal charges developed by the sensors following the integration period, comprising in combination:
  (a) clock means for continuously generating a succession of integration shift pulses, the interval between each successive pair of said shift pulses providing an integration period of predetermined fixed length;
  (b) means for generaing a start integration signal in response to a demand for a line of image signals; and
  (c) control means responsive to said start integration signal for interrupting the current one of said integration periods to start the next one of said integration periods when said start integration signal is not synchronized with said shift pulses;
  (d) said control means including means to displace subsequent ones of said shift pulses to bring said subsequent integration pulses into timed synchronization with said start integration signal.

5. In a raster input scanner having a least one array for scanning a document line by line to provide image signals representative of the image area scanned, movable carriage means supporting said array in scanning relation with said document, and drive means for moving said carriage means to progressively scan said document line by line, the combination of:
  (a) clock means providing a succession of integration shift pulses at a fixed rate, the interval between succeeding ones of said shift pulses establishing an integration period of preset length for said array prior to starting the next integration;
  (b) means responsive to movement of said carriage through a distance of one scan line for generating a start integration signal;
  (c) control means responsive to said start integration signal for prematurely interrupting the current one of said integration periods to start the next of said integration periods when said start integration signal is not synchronized with said shift pulses;
  (d) said control means including means to displace subsequent ones of said shift pulses to bring said subsequent shift pulses back into timed synchronization with said start integration signal.

* * * * *